United States Patent
Schrott

(10) Patent No.: US 7,857,558 B2
(45) Date of Patent: Dec. 28, 2010

(54) COMPACT CUTTING HEAD FOR MACHINING WORKPIECES

(75) Inventor: Rudiger Schrott, Hochdorf (DE)

(73) Assignee: F. Zimmerman GmbH, Denkendorf (DE)

(*) Notice: Subject to any disclaimer, the term of this patent is extended or adjusted under 35 U.S.C. 154(b) by 785 days.

(21) Appl. No.: 11/894,700

(22) Filed: Aug. 21, 2007

(65) Prior Publication Data
US 2008/0078075 A1 Apr. 3, 2008

(30) Foreign Application Priority Data
Aug. 22, 2006 (DE) .................. 10 2006 039 202

(51) Int. Cl.
*B23C 1/12* (2006.01)
(52) U.S. Cl. .................. 409/216; 409/201; 409/212
(58) Field of Classification Search ............ 409/201, 409/211, 216, 202, 212; 408/236; 144/135.4
See application file for complete search history.

(56) References Cited

U.S. PATENT DOCUMENTS
2,445,039 A 7/1948 Rusnok (Continued)

FOREIGN PATENT DOCUMENTS
CH 533 481 A 3/1973

(Continued)

*Primary Examiner*—Erica E Cadugan
(74) *Attorney, Agent, or Firm*—R. S. Lombard; K. Bach

(57) ABSTRACT

A milling machine (1) for the machining of large components includes a milling head (9) which includes a support beam (8) which is movable along a longitudinal axis (Z); a pivot body (14) which is supported and guided by the support beam (8) by way of a curved guide arrangement (36) so as to be pivotable about a first pivot axis (B) which extends normal to the longitudinal axis (Z) and a motor milling spindle (11) which is supported on the pivot body (14) so as to be pivotable about a second pivot axis (A) which extends normal to the first pivot axis (B). The rotation of the pivot body (14) and of the milling spindle (11) is controlled by drive arrangements (37, 50) assigned to the pivot axis (A, B). The curved guide arrangement (36) includes guide carriages (34) attached to them support beam (8) and a circular arc segment-shaped guide track (32) which is attached to the pivot body (14) and which provide for pivot range about the first pivot axis (B) of at least 180.degree.. A cavity (31) provided in the pivot body (14) for the accommodation of the milling spindle (11) provides for a pivot range of at least about 180° about the second pivot axis (A). The milling head (9) is compact and light-weight in its design and has a relatively small unobtrusive contour whereby the manufacture of complex surfaces is made possible with high quality and a relatively short machining time.

25 Claims, 4 Drawing Sheets

U.S. PATENT DOCUMENTS

| | | | |
|---|---|---|---|
| 2,948,168 A * | 8/1960 | Mccormick | 408/236 |
| 3,083,617 A * | 4/1963 | Swanson et al. | 409/211 |
| 3,413,893 A * | 12/1968 | Wilson | 409/201 |
| 3,559,529 A * | 2/1971 | Vertin | 409/117 |
| 3,668,971 A | 6/1972 | Dever | |
| 3,843,276 A * | 10/1974 | Williams | 408/236 |
| 4,101,405 A | 7/1978 | Inoue | |
| 5,477,597 A * | 12/1995 | Catania et al. | 409/216 |
| 5,664,308 A * | 9/1997 | Deitert | 409/201 |
| 6,045,307 A * | 4/2000 | Ikoma et al. | 409/201 |
| 6,431,802 B1 * | 8/2002 | Wahl | 409/201 |
| 2001/0046423 A1 * | 11/2001 | Colombo | 409/216 |
| 2004/0151556 A1 * | 8/2004 | Ferrari et al. | 409/201 |
| 2007/0059116 A1 * | 3/2007 | Brunemann | 409/201 |

FOREIGN PATENT DOCUMENTS

| | | |
|---|---|---|
| DE | 198 50 603 A1 | 5/2000 |
| DE | 100 27 509 A1 | 12/2001 |

* cited by examiner

COMPACT CUTTING HEAD FOR MACHINING WORKPIECES

BACKGROUND OF THE INVENTION

The present invention concerns a tool head unit with a machine tool spindle or, respectively a milling or cutting head unit with a motor cutting head spindle and a machine or, respectively, a milling machine with such a tool spindle unit.

In a post-published patent application with the docket No. 10 2005 043 835.0 filed 13 Sep. 2005 a portal milling machine is described which includes a portal supported on side supports and a machine table firmly anchored to a foundation. The portal is movable in a horizontal X-direction and carries a vertically arranged arm which is movable in a horizontal Y-direction which is normal to the X-direction. The arm carries a support beam which is movable in a vertical Z-direction and carries a milling head with a motor milling spindle.

The milling head includes a fork which, by a torque motor, is rotatable about C-axis coinciding with the Z-axis. The spindle housing of a milling spindle is on two fork arms so as to be pivotable about an A-axis extending normal to the C-axis. A further torque motor is provided as drive for the pivoting of the spindle housing about the A-axis. The milling spindle includes a cutting tool which is driven by a motor and which projects outwardly from the spindle housing for performing during operation a cutting procedure on a workpiece placed onto the machine table.

The milling machine is intended for the manufacture of tools, molds and models or for the manufacture in the automobile—air and space travel industries and is suitable to work very large and complicated 3-dimensional components which may have very fine surface details. It permits the execution complicated 5-axis simultaneous operations with high precision in a relatively short period.

However there are certain disadvantages associated with this type of milling heads which use a combination of a for example vertical axis of rotation C and a for example horizontal pivot axis A which extends normally thereto. During the positioning of the milling tool into the angular position which is required for the machining of the workpiece a rotation of the milling tool by a substantial angle about the C axis may be necessary if it happens to be in an unfavorable angular position about the A-axis. This is particularly true, if its rotation about the C-axis is limited to about +/−180° with respect to a predetermined zero position because of the guide arrangement for the cables required for the energy supply and the signal transmission. In an extreme case a back-rotation about the C-axis by almost a full turn may become necessary for only a small position change. As a result the operating speed is substantially reduced. It would of course also be possible to use slide contact rings for the transmission of the energy and the signals but this would substantially increase the costs of a milling head.

Furthermore, with the use of a milling head with A- and C-axes an electronic orientation error compensation is not possible or is possible only with very high expenditures. Therefore all components of the milling head and of the milling machine must be manufactured and operate with high precision in order to obtain the required quality.

WO 00/25976 A2 discloses a joint tool head based on the principle of rod kinematics. It includes a tool platform which is movable along three axes, at least three guide arms which are linked to the tool platform and are movable independently of one another in parallel, and at least three linear drives arranged in spaced relationship around the tool platform for operating the guide arms linked thereto. The links are linked to the tool platform so as to be movable in any direction and to the linear movement drives so as to be pivotable about axis extending normal to the direction of movement of the linear movement drives. At the tool platform a motor spindle may be arranged in such a way that it is movable about two pivot axis and along a linear axis. Because of the support arrangement of the tool platform the motor spindle can rapidly be brought unto any required position within the measuring space. However, because of a highly limited length of the linear axis and a pivot angle limited to about +/−40° the measuring space is relatively small so that the application area is limited. Large 3D-parts as they are used for example in connection with model form and die tool construction can hardly be manufactured.

DE 198 50 603 A1 discloses a milling head unit with a cardanic joint support structure for a milling spindle. The milling head unit includes a support housing which is mounted to a spindle beam which is movable in X-, Y-, and Z directions and a pivot housing which is accommodated in the support housing so as to be pivotable about a first axis B. The pivot movement about the axis B is caused by torque motors which are flanged at both sides to the support housing and which directly drive the pivot housing. In the pivot housing a spindle accommodation housing is arranged so as to be pivotable about a horizontal axis A and is pivoted by torque motors arranged at opposite sides. The spindle accommodation housing carries a motor milling spindle with a direct drive for a milling tool. With the pivot axes A, B of the milling head unit which extend normally to one another and not parallel to the Z-axis, the milling spindle can be pivoted directly and rapidly into any required work position. Pivoting about a C-axis coinciding with the Z-axis is not necessary. As a result, with this kind of milling head unit with A- and B-pivot axes an electronic orientation error compensation is possible.

The cardanic support as it is proposed in DE 198 50 603 A1 however requires a relatively large construction space. Each housing is essentially box-like, so as to accommodate therein another housing, together with a drive shaft therefor. As a result also the pivot angle about the pivot axis A, B is very much limited.

Based on this state of the art it is the object of the present invention to overcome the above disadvantages and, respectively shortcomings. It is particularly an object of the present invention to provide a dynamic tool head unit suitable for tool and die and model construction, which is of relatively compact design and provides for relatively large pivot angles. Preferably the arrangement of the tool head unit should facilitate an electronic orientation error compensation.

Another object of the present invention is to provide a machine tool with such a tool head unit by which also large 3 D-components can be manufactured with a high operating speed.

These and other objects of the present invention are solved by the tool head unit according to the invention.

SUMMARY OF THE INVENTION

A milling machine (1) for the machining of large components includes a milling head (9) which includes a support beam (8) which is movable along a longitudinal axis (Z); a pivot body (14) which is supported and guided by the support beam (8) by way of a curved guide arrangement (36) so as to be pivotable about a first pivot axis (B) which extends normal to the longitudinal axis (Z) and a motor milling spindle (11) which is supported on the pivot body (14) so as to be pivotable about a second pivot axis (A) which extends normal to the first pivot axis (B). The rotation of the pivot body (14) and of the milling spindle (11) is controlled by drive arrangements (37, 50) assigned to the pivot axis (A, B). The curved guide arrangement (36) includes guide carriages (34) attached to the support beam (8) and a circular arc segment-shaped guide track (32) which is attached to the pivot body (14) and which provide for pivot range about the first pivot axis (B) of at least 180°. A cavity (31) provided in the pivot body (14) for the accommodation of the milling spindle (11) provides for a pivot range of at least about 180° about the second pivot axis (A). The milling head (9) is compact and light-weight in its design and has a relatively small unobtrusive contour whereby the manufacture of complex surfaces is made possible with high quality and a relatively short machining time. (FIG. 3)

The tool head unit according to the invention provided for the milling of workpieces comprises a carrier which defines a longitudinal axis Z which, driving operation, extends for example vertically, a pivot body which is supported on the carrier and which is pivotable by means of a first drive arrangement about a first pivot axis B which extends normal with respect to the carrier, and a machine tool spindle which is supported on the pivot body and is pivotable by means of a second drive arrangement about a second pivot axis A. The pivot axis A and B extend preferably normal to each other and intersect the Z-axis about the center of the machine tool spindle.

In accordance with the invention at least one or several curved intermediate guide structures are provided for the pivotal support and guidance of either the pivot body with respect to the carrier and/or of the machine tool spindle with respect to the pivot body. The at least one curved guides structure above provides for the support and the guidance; no additional means are needed therefor nor provided. In this way a basis is established for a simple compact arrangement and a relatively large pivot angle of almost, or more than 180°.

A curved guide structure arrangement in the sense used herein is to be understood to be a curve linear guide structure for the realization of very accurate circular or curved movement. The element to be pivoted or, respectively, the pivot body is supported and guided by another component, such as a carrier only via the curved guide arrangement according to the invention. No other support means is needed. As a result, it is no longer necessary to make a component which pivotally supports another component fork- or box-shaped. The components can be dimensioned to be smaller and the space requirements can be reduced to minimum. This results in a compact design for the tool head unit with small interference contour wherein the costs and also the moving masses can be substantially reduced. The driven shafts can be accelerated more rapidly so that a highly dynamic tool head unit and machine tool can be realized. X-, Y-, and Z-drives for moving the tool head unit in all three spatial directions may be smaller. With the curved guide arrangement according to the invention a precise guiding is achieved and even complex shapes can be rapidly machined. This is particularly true because the set-up according to the invention of the pivot body and the curved guide structure arrangement make pivot movements up to +/−90° with respect to predefined zero position possible or even more. The zero position may be predetermined for example by the direction of the Z-axis.

By using the two orthogonal pivot axes A and B of the tool head unit which both extend non-parallel and particularly at a right angle to the Z-axis an electronic orientation error compensation is possible. To this end, the increasing space must be accurately measured out in a calibration procedure with the milling head unit being disposed in different positions.

The determined deviations between the actual and the desired values of the positions can be used by a control unit driving the machining operation to reset the milling head unit into the precise position. In this way the requirements for the manufacturing and assembly accuracy of the components, the guide structures and the support structures can be reduced which the quality of the products produced remains the same. Furthermore expenses are saved.

The tool head unit according to the invention is preferably used as a milling head unit carrying a milling spindle. Preferably, it comprises a motor milling spindle with an integral motor drive for the tool of the milling spindle. It may also include a milling spindle drive desired for example from a separate main drive. The milling spindle is preferably accommodated in a spindle receiver which is pivotally supported on the pivot body and which facilitates a simple and rapid tool exchange. Also other applications for the tool head unit according to the invention are possible for example for boring or other cutting operations.

For the realization of the curved guide arrangement according to this invention at least one circularly curved guide track is provided which is arranged either on the pivot body and/or on the spindle arm, respectively, the spindle carrier, and at least one associated guide carriage which is supported on the guide track and which is connected to the carrier and/or the pivot body. A high rigidity can be achieved if two guide tracks extend around the respective pivot axis B or, respectively, A in a coaxial arrangement and in parallel spaced relationship. Furthermore, preferably, each guide track carries two spaced guide carriages. Depending on the distance between the guide carriages the rigidity and the maximally possible pivot angles can be adapted to the various requirements. The guide carriages are supported on the guide track by way of accurately fitted contact surfaces and preferably by balls or similar components in order to ensure a mostly clearance-free and precise movement with little friction. The guide carriages and the guide tracks may also be joined via a friction slide structure.

The guide track is in the form of a curved circle segment which encloses an arc segment angle of at least 180°, preferably at least 200°. It may extend advantageously over up to 270° or even more so that the machine tool spindle can be positioned at an acute angle with respect to the Z-axis in order to be able to produce also complicated surface structures with under cuttings, and similar structures. To facilitate the assembly and to achieve a high guide precision the guide tracks consists preferably of a single piece. However, a multi-part embodiment with individually accurately manufactured and assembled guide track segments is also acceptable.

In a particularly preferred embodiment the circle segment-like guide arrangement is disposed effectively between the carrier and the pivot body. A very compact design for large pivot angles is obtained if in this case the guide track or, respectively guide tracks is or are attached to the pivot body whereas the carrier comprises the guide carriages. As carrier essentially an elongated support beam may be used which at its end facing the pivot body includes two beam extensions which slightly extend around the pivot element. Since no central pivot body shaft needs to be supported the extent of the extensions of the carrier in the longitudinal direction Z is selected to be substantially less than half the longitudinal extent or the height of the pivot element. The carrier extension may be only a small fraction or, respectively essentially less than a quarter of the longitudinal extent of the pivot element. The carrier extensions only need to accommodate the guide carriages and extend around a section of the guide track attached to the pivot body.

The pivot body comprises preferably an essentially cylindrical base body of a C-shaped configuration whose form and use is defined by the circular arc shaped guide tracks. The guide tracks are arranged for example at the axial front sides essentially flush with the circumferential surface of the pivot body and opposite the guide carriages arranged in the carrier extensions. Between the free ends of the guide track also the base body has a cavity which extends parallel and through the first pivot axis B, in particular normal to the second pivot axis A and in which the tool spindle or, respectively, the spindle carrier is movably arranged. The width of the cavity or, respectively, the distance between the free ends of the guide tracks is greater than the dimension of the machine tool spindle or, respectively, the machine tool spindle carrier as measured in the direction of the normal distance. In this way the machine tool spindle, upon pivoting about the axis A, can move in the pivot planes about the first pivot axis B defined by the axial face areas of the base body or respectively the guide tracks.

In a further development of this embodiment the cylindrical pivot body includes two C-shaped circular disc segments which are arranged in the direction of the first pivot axis B in parallel spaced relationship relative to each other and which are interconnected by two connecting webs which extend in parallel relationship in the direction of the second pivot axis A. Between the connecting webs there is a passage which leads to the spindle accommodating cavity and which facilitates the passage of cables for the transmission of signals and for supplying energy to the first and the second drive arrangement.

The first drive arrangement for pivoting the pivot body about the first pivot axis B comprises a motor mounted on the carrier, preferably a servo-motor, and a step-down transmission effectively arranged between the motor and the pivot body. In preferred embodiment of the transmission, the cylindrical body is provided at its circumference, preferably at a disc segment with a spur gear structure, preferably a helical gear structure, with which a pinion mounted on this drive shaft of the motor is in engagement. Preferably only one step down gear stage is provided. An electronically interconnected drive arrangement may be provided wherein for example two servo motors are used which are arranged in spaced relationship in the circumferential direction of the base body and an engine control arrangement causes the servo-motors to operate slightly in opposition. In this way, in a simple manner a permanently play-free and servicing free drive arrangement is provided. A mechanical pre-tension of a gear structure or pre-tensioned by means of spring means is also possible.

For maintaining the relative pivot angle between the carrier and the pivot element a first measuring arrangement is provided. This may be for example a measuring tape attached to one of the disc segments and a reading head disposed on the carrier which detects the relative angular position preferable in a contact-free manner. Different, for example optical, magnetic or capacitive measuring systems, also tactile measuring systems are known in the art which may be used in this connection.

For the recalibration of the pivot movement about the second pivot axis A a shaft is rotatably supported in the pivot body, for example in the connecting webs, for example by means of a suitable housing structure such back to back roller bearings on which this machine tool spindle or, respectively, this machine tool spindle receiver is firmly supported. The second drive arrangement can in this case, advantageously be formed by a torque motor which is adapted to directly drive, and control the rotation of the tool spindle. No transmission is needed in that case. In this way, the dynamics and the rigidity of the tool head unit can be improved. The relative pivot angle between the tool spindle and pivot body is detected by an additional measuring arrangement which includes a rotation pick-up mounted on the shaft and a sensor mounted on the pivot body.

Optionally the tool spindle can be supported and guided by the pivot body also by way of curved guide arrangement as disclosed herein. The curved guide arrangement is then accordingly formed by one or two circular or curved guide tracks attached to the tool spindle or, respectively, the spindle carrier and the guide carriage attached to the pivot body. With respect to possible embodiments and advantages of the curved guide arrangement reference is made to the earlier description.

In accordance with another aspect of the present invention, a machine took, particularly a milling machine for example a portal-type milling machine, is provided which, in a three-dimensional measuring space has an arm which can be positioned in the X, Y and Z directions and which carries a tool head unit, particularly a milling head unit with the above mentioned features. A machine tool with a filigree tool head can be provided which is suitable for very large 3D components for 5-axes simultaneous machining whereby also complicated and very fine surface details can be produced with high precision and at a high speed.

BRIEF DESCRIPTION OF THE DRAWINGS

Further advantageous particulars of the invention are defined in the drawings and the description. In the drawings an exemplary embodiment of the subject matter according to the invention is shown. It is shown in.

DESCRIPTION OF THE PREFERRED EMBODIMENTS

Figure 1:
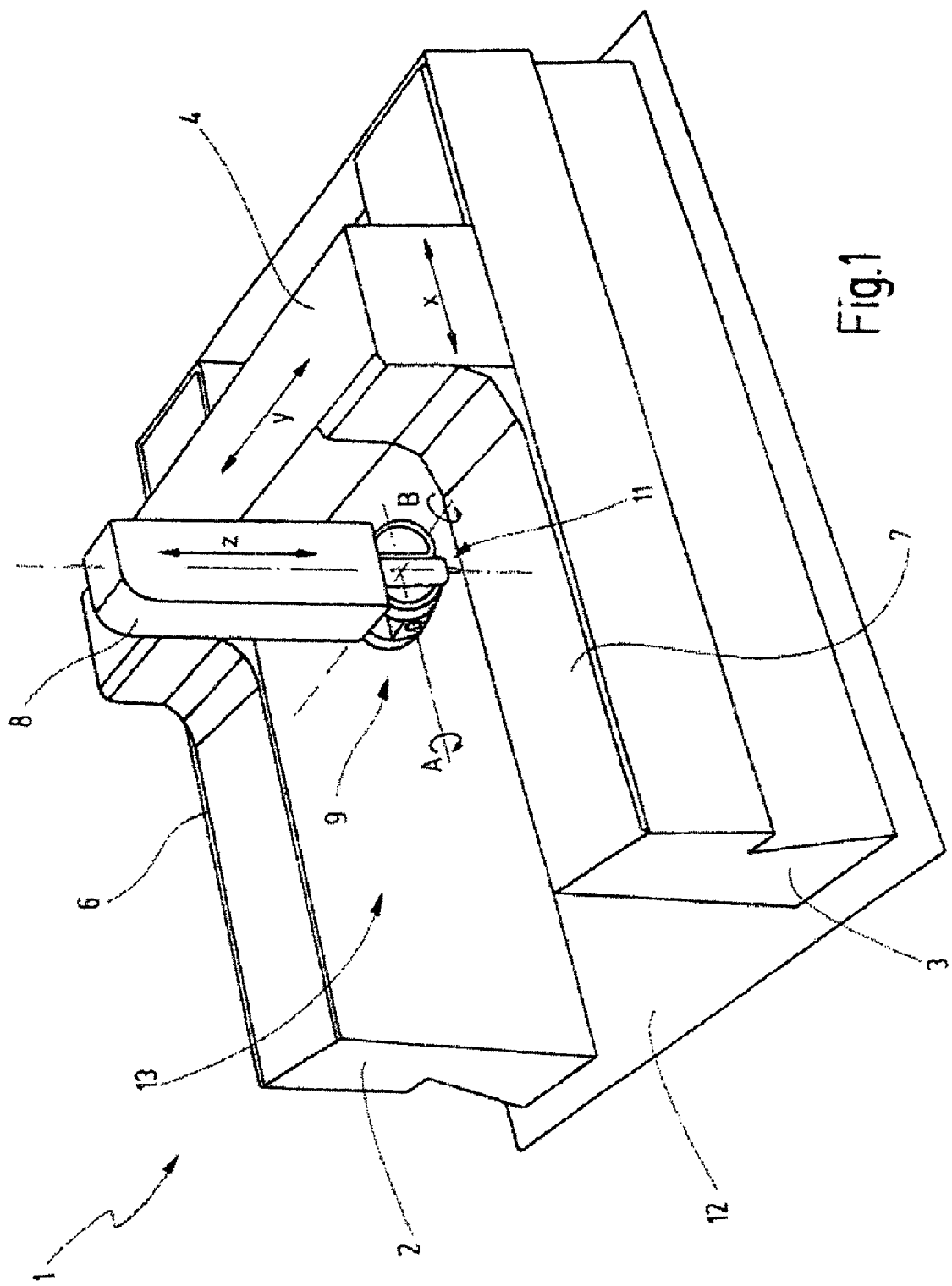
FIG. 1 a portal milling machine according to the invention in a schematic perspective representation.

FIG. 1 shows schematically a portal milling machine 1 according to the present invention. The portal milling machine 1 comprises a portal 4 supported by elongated solid side supports 2, 3 which are movable in a horizontally X-direction indicated by a double arrow and which are precisely guided by guide structures 6, 7 provided at the opposite side supports 2, 3. On the portal 4 a vertically extending support beam 8 is arranged which is movable by a cross-carriage along the portal 4 in the indicated horizontal Y direction and by a Z carriage in vertical Z direction. The support beam 8 carries the milling head 9 with a milling spindle 11 which serves for the machining of a workpiece which is not shown, but which is to be disposed on a machine table anchored to the foundation. The milling head 9 with the milling spindle 11 can be moved as desired in all three coordinate directions X, Y, Z of a three-dimensional measuring space 13 as determined by the side supports 2. The drive motors, associated guide structures, carriages, distance measuring systems and control arrangements are not shown in FIG. 1 for simplicity reasons. They are known as such and not part of the invention.

Figure 2:
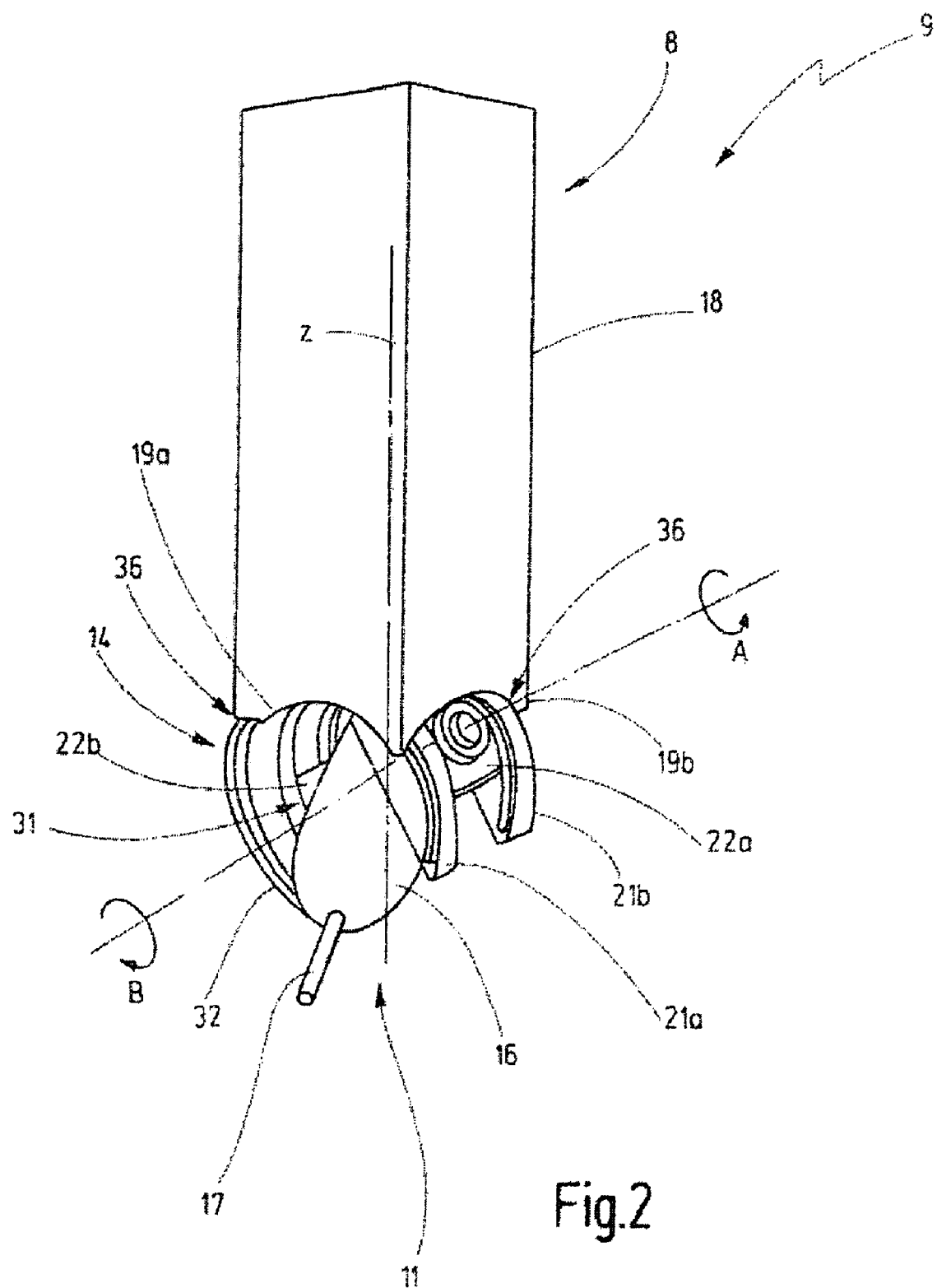
FIG. 2 a simplified enlarged perspective representation of a milling head according to the invention used in the portal milling machine according to FIG. 1.
Figure 3:
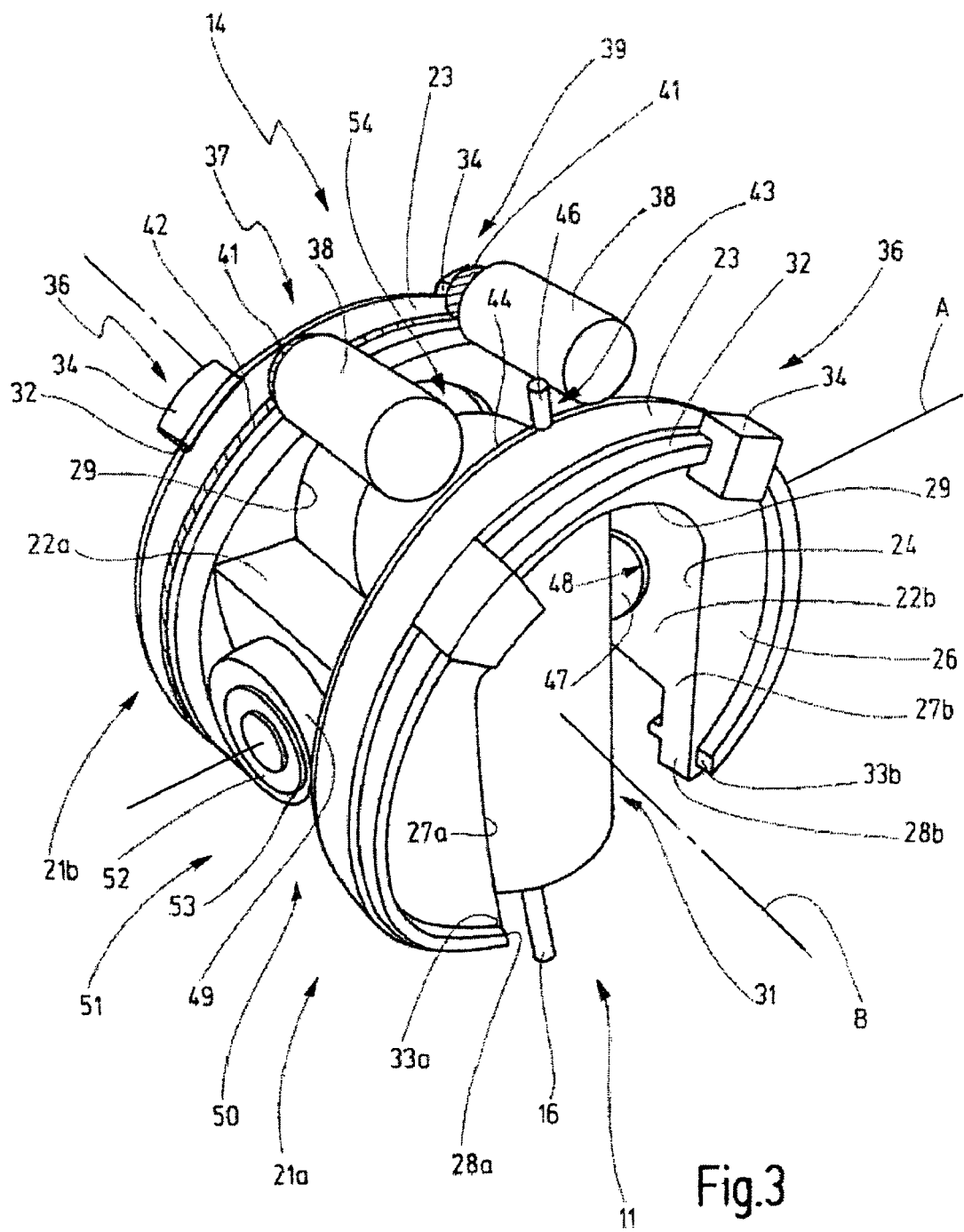
FIG. 3 the milling head shown in FIG. 2 in a perspective representation with the milling head carrier removed and presented in a different scale; and, FIG. 4 another embodiment of a milling head according to the invention in a simplified representation.

The milling head 9 according to the invention is shown in greater detail, partially schematically, and in different scales in FIGS. 2 and 3. The milling head 9 includes essentially the support beam 8 which serves as carrier, a pivot body 14 supported on the support beam 8 so as to be pivotable about a first pivot axis B and the milling spindle 11, which is supported exchangeably in a spindle receiver 16 and which carries at its free end a tool 17, or respectively, a milling tool. The spindle receiver 16 is supported on the pivot body 14 so as to be pivotable about another pivot axis A. The first pivot axis B is a horizontal axis which extends normal to the Z direction and parallel to the Y direction and in the YZ plane. In the zero position of the milling head 9 as shown in FIG. 1 in which the milling tool 17 extends vertically downwardly in the Z direction the second pivot axis A extends parallel to the direction of the Y axis and normal to the Z axis. All three axes A, B, and Z intersect in a point which is disposed about in the center of the milling spindle 11.

The support beam 8 has a housing 18 of an essentially square cross-section which is omitted in FIG. 3 for clarity reasons in order to show the essential components which are disposed as will be explained below. In the lower end of the housing 18 as shown in the figures facing the pivot body 14 the housing extensions 19a, 19B are provided which extend around the sides of, and support, the pivot body 14 when viewed in the direction of the B axis.

The pivot body 14 has a shape which is essentially cylindrical and with respect to the center plane defined by the pivot axis A and B symmetrical. It includes two C-shaped circular disc elements or segments 21a, 21b when viewed from the top which are arranged in spaced relationship in the direction of the B-axis and are arranged in a parallel and concentric arrangement as well as two connecting webs 22a, 22b of essentially square cross-section which extend in the direction of the B axis between the disc elements 21a, 21b and interconnect the disc elements and which are preferably all together integrally formed with the disc elements 21a, 21b. The disc elements 21a, 21b each have an outer cylindrical circumferential surface 23, a radially inner surface 24 and an outwardly directed axial face area 26. The radially inner surface 24 includes two wall sections 27a, 27b which extend in spaced relationship from, and parallel to, each other and are interconnected by a curved inner wall 29. The wall sections 27a, 27b and the inner wall 29 deliver a cavity 31 which extends through the whole pivot body 14 that is along the B-axis starting at the axial front face 26 of the first disc element 21a, through that disc element and between the connecting webs 22a, 22b and on through the other disc element 21b up to the axial front face area 26 thereof. The height and width of the cavity 31 is so selected that the milling spindle 11 can be accommodated therein and be portable about the second pivot axis A. The distance between the walls 27a and 27b of the inner surface 24 is slightly larger than the width of the spindle reception area 16.

At the axial front surface 26 of each disc element 21a, 21b there is a circular segment-shaped guide track 32. The guide track 32 extends from a first free end 33a which is near the free end 28a of a C-leg of the disc element 21a, 21b along the circumference 23 newly in contact therewith up to a second free end 33b, which is arranged near the free end 28b of the second C-leg of the disc element 21a, 21b. The arc segment angle surrounded by the guide track is, with respect to a center point disposed on the B axis, about 270°. At the guide track 32 of each disc element 21a, 21b, there are supported two guide carriages 34 which are disposed, spaced from each other in circumferential direction, on the support beam 8, in particular on the housing extensions 19a or, respectively, 19b. The guide carriages 34 form together with the guide tracks 32 a curved guide arrangement 36 according to the invention, which facilitates a precisely curved movement of the pivot body 14 with respect to the carrier beam 8 about the first pivot axis B. The distance between the guide carriages 34 which are assigned to a guide track 32 is as small as possible in order to achieve a large pivot range but sufficiently large to provide for a rigid guide arrangement. The angular spacing between the guide carriages 34 is here about 6° to 90° whereas the outer diameter of the guide tracks 32a of the pivot body 16 is about 50 to 60 cm.

For the motorized rotating of the pivot head 14 about the first pivot axis B a first drive arrangement 37 is provided which in the present case includes two servo-motors 38 which are arranged spaced from each other around the circumference of the pivot body 14 and are attached to the support beam 8 and also step down transmission arrangements 39 which connect the servo-motors to the pivot bodies for driving them. To this end the servo-motors 38 the drive shafts of the servo-motors which are not shown carry each a pinion 41 which pinions are in engagement with a spur gear structure 42 provided at the circumferential area 23 of the disc element 21b. The tooth structures of the pinions 41 and of the spur gear structure are preferably helical gear structures. Additional step down transmission stages may be provided. By means of a control arrangement which is not shown the servo-motors 38 may be so controlled that the drive arrangements are slightly counter-active for making any play in the transmission structure ineffective.

For determining the relative angular positions of the support beam 8 and the pivot body 14 a first measuring arrangement 43 is provided. The measuring arrangement 43 includes in the present case a measuring tape 44 which is arranged at the disc element 21a and which extends around the circumferential area 23, and a reading head 46 which is arranged at a small distance from the measuring tape 44 in order to detect the angular position with respect to the B-axis. The detected measuring signals are transmitted to the control arrangement via communication lines which are not shown but which like the power supply lines for the drive arrangements, also extend through the support beam 8 for the position control in the B axis and the A axis.

The milling spindle 11 is firmly mounted for rotation with a shaft 47 which is rotatably supported in the connecting webs 22a, 22b of the pivot body 14. To this end the connecting webs 22a, 22b are provided with bores 48 which are co-axial with the pivot axis A and include bearing means for example cross-roller bearings for rotatably supporting the shaft 47. At both ends of the shaft 47 torque motors 49 are connected to the shaft for directly driving the shaft without transmission and for controlling the rotation of the shaft 47 about the second pivot axis A. The torque motors 49 being servo-motor designed for generating high toques and forming a second drive arrangement 50. In addition, between the shaft 47 and the pivot body 14 a second angle measuring arrangement is provided which is shown here, only as example, in the form of a transmitter 52 mounted on the shaft 47 and an angular position sensor 53 mounted on the disc element 21a and which serves to determine the relative angular position of the shaft 47 and the milling spindle 11 with respect to the A axis and to transmit it to the control arrangement.

As apparent from FIG. 3 a passage 54, which extends from the outside to the cavity 31, is provided between the connecting webs 22a, 22b and the disc elements 21a, 21b in the upper area of the pivot body 14. The passage 54 accommodates energy supply, control and signal transmission lines extending to the drive arrangements 37, 50, the angle measuring arrangements 43, 51 and the milling spindle 11. Advantageously also the mass of the movable pivot body 14 is reduced so that drive energy can be saved.

The milling machine 1 with the milling head 9 as described so far is equipped for simultaneous 5-axis machining of workpiece surfaces, particularly for the accurate machining of large 3D components as they are used in the automotive, air and space travel industry. It operates as follows:

During operation a workpiece to be machined is positioned in the measuring space 13 on the machine table 12. A numeric control of the milling machine controls the drives assigned to the linear axes X, Y and Z so as to move the milling head 11 into a proper milling position. The whole machine structure including the fixed side supports 2, 3, the structurally rigid portal 4 the linear drives etc., is designed for high dynamic rigidity. As a result very rapid advances and high axial accelerations of even more than 5 m/sec$^2$ can be achieved without causing substantial shocks or vibrations as a result of rapid advances and load changes.

Together with the control of the above-mentioned linear drives, the control activates the servo-motors 38 and the torque motors 49 to effect a rotation of the pivot body 14 with respect to the support beam 8 about the first pivot axis B and a rotation of the shaft 47 with respect to the pivot body 14 about the second pivot axis A and, consequently, a controlled positioning of the milling spindle 16. During pivoting the pivot body 14 is precisely guided by the curved guide arrangement 36. The two guide tracks 32 with the associated guide carriages 34 provide for a rigid and play-free support and guidance. The relatively large arc segment angle of the guide tracks 32 and the suitably selected distance between the guide carriages 34 provide for a pivot angle of up to at least +/−90° and possibly more than +/−100° about the first pivot axis B with respect to the zero position. In addition, the milling spindle 11 can, as a result of the shape of the pivot body 14, particularly the cavity 31, be pivoted about the second pivot axis A by at least +/−90° or even more than +/−100° about the second pivot axis A with respect to the zero position. Herein the milling spindle 11 can extend through the pivot planes of the guide tracks 23 or, respectively the pivot axis B. With these pivot ranges highly complex surfaces and details can be milled with very high quality.

With the use of the two pivot axis A and B which extend normally to each other, the milling tool 17 can be transferred to the next required operating position in the most direct way. A return pivoting about an axis as it is necessary for conventional milling heads with an axis of rotation C and a pivot axis A is not necessary in the present case. The machining speed can be substantially increased. In addition an electronic orientation error connection can be performed during the machining process. To this end the measuring space 13 is measured out as completely as possible in a calibration procedure after installation of the milling head 9 in the portal milling machine 1 with different angular positions of the milling tool 17, in order to determine the deviations between the actual and the desired position and to store these values in the control. During a milling process these deviations are automatically utilized for position connections. In this way the requirements for accuracy in the manufacture and the assembly of the components of the milling machine 1 generally and especially of the milling head 9 can be lowered while a high machining precision is maintained, whereby costs can be substantially reduced.

With the arrangement according to the invention also the weight of the milling head 9 is substantially reduced with permits greater accelerations and reduces vibration tendencies. Furthermore the dimensions of the milling head 11 are substantially reduced and it is much less obtrusive. With the curved guide structure 36 the support beam 8 needs to extend around the pivot body 14 only slightly. Obtrusive forked arms for the support of pivot shafts and nested housing parts as they are used in conventional arrangements are not present. The result is a compact milling head 11 which facilitates milling of very fine contours in a small space.

With specific measures such as an electronic play-free engagement of the drive arrangements 39, the provision of torque motors for pivoting the milling spindle 11 about the A-axis, the particular design of the elements, the precise on play-free curved guide arrangement 36, the small construction volume and weight of the milling head 9 etc., a basis is provided for obtaining a high dynamic rigidity and machining accuracy with high safety, high economy in operation and a long life of the milling machine 1.

In connection with the invention numerous variations and modifications of the embodiment described above are possible. For example, the milling head 9 may also be movable along a horizontal Z-direction. Furthermore, the form of the pivot body may differ from that shown, which is optimized with a view to a small mass and construction volume. The guide track 32 could also be arranged at the outer circumference 23 of the pivot body 14 above the guide carriages and the support beam 8. In principle also a design of the curved guide arrangement 36 with only a single guide track 32 would be possible. Vice versa, in addition to the curved guide arrangement 36 at least one additional curved guide arrangement may be provided in a parallel arrangement. Although it is not apparent from the figures the guide carriages 34 are supported on the guide track via a ball circulation mechanism or in a similar way in order to provide for friction-force movement. Instead of the two servo-motors 38 also a single motor with a transmission arrangement may be provided which includes a gear arrangement with several step-down stages. A mechanically pre-tensioned play-free gear drive may be used. Also the torque motors 49 may be replaced by servo motors with gear transmissions. With the torque motors however, the dynamics of the milling head 9 is substantially increased. As angle measuring arrangements 43, 51 any mechanical, optical, magnetic or capacitive type measuring systems may be used, or the required angle positions may be indirectly deducted from the relative angular positions of for example drive shafts of the motors or similar.

Figure 4:
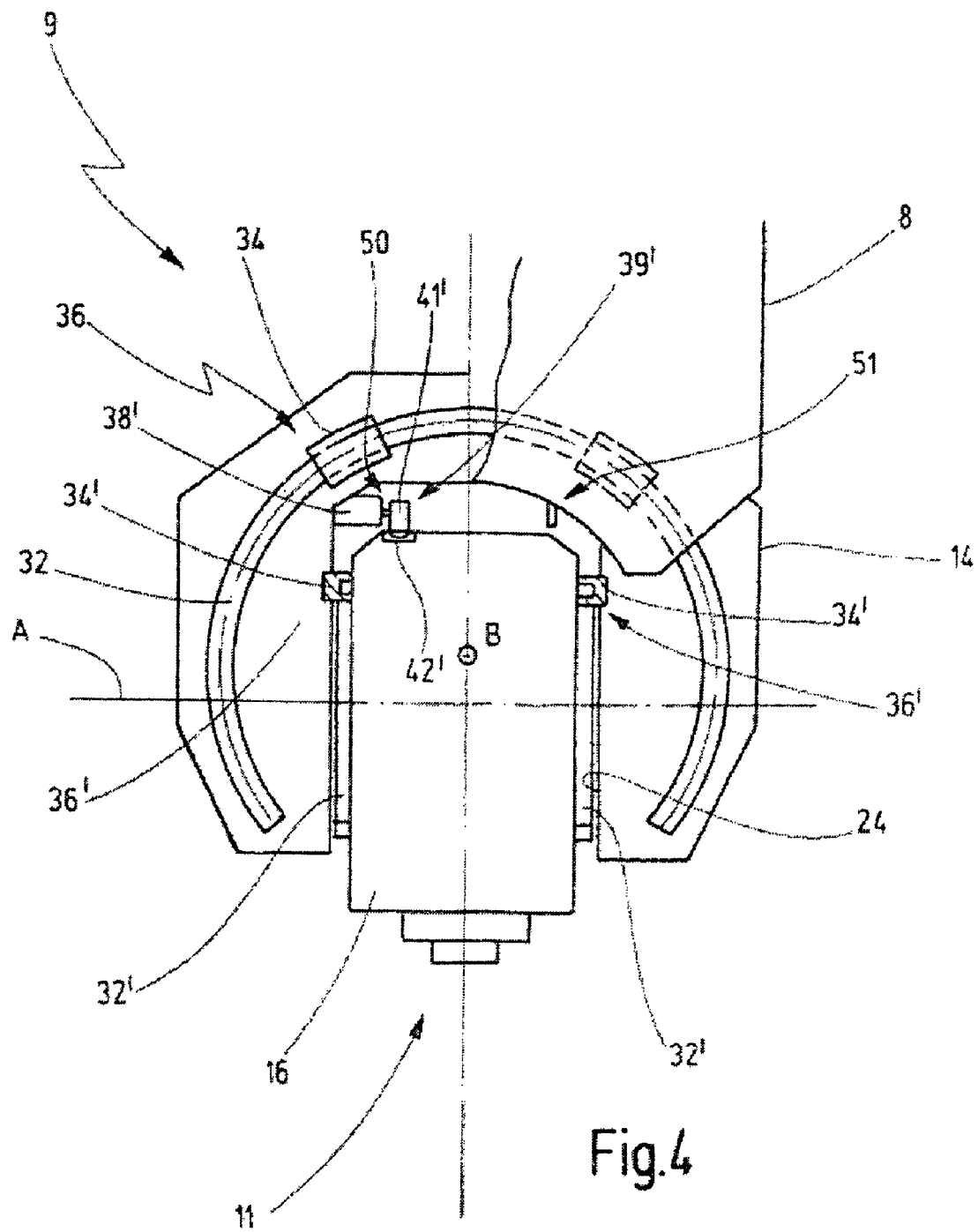

Another embodiment of the invention is shown in a highly simplified principle representation of FIG. 4. As far as identical components in design on function are concerned reference is made to the earlier description with the use of the same reference numerals. The embodiment shown in FIG. 4 differs from that according to FIGS. 1 to 3 particularly in that here a curved guide structure 36' is provided also for guiding the milling spindle 11 during pivoting thereof around the second pivot axis A. To this end the spindle receiver 16 of the milling spindle 11 is essentially cylindrical and includes at its front face facing the inner surfaces 24 of the pivot body 14 ring or circular arc segment-like guide tracks 32' with which guide carriages attached to the pivot body cooperate. The second drive arrangement 50 can be formed based on the first drive arrangement 37 by servo-motors 38' and transmission arrangements 39' which are connected to the servo-motors 38' and which include pinions mounted on the drive shaft of the servo-motors 38 and a helical gear structure provided on the circumferential area of the spindle receiver 16. Except for the precise support and guide arrangement by means of the additional curved guide arrangement 36' the milling head according to FIG. 4 functions in the same way as that shown in FIGS. 1-3 so that, in order to avoid repetitions, the earlier description of the mode of operation and the advantages apply. A curved guide arrangement could, in principle, only be provided between the pivot body 14 and the milling spindle 11.

Also, herein a portal milling machine 1 and a milling head 9 for the special application of milling surface area structures is shown, it is to be understood that the milling machine may be designed differently or may be provided as machine tool for other shaping applications, for example for boring. Consequently, the milling head 1 forms generally a tool head unit 1, which carries a suitable machine tool spindle 11 so as to be pivotable about the two pivot axis A and B. It is apparent that with respect to the special arrangement described herein no limitation of the protection area is intended or should be established. Rather the attached claims are intended to cover all modifications encompassed by the claims.

A milling machine 1 designed for machining large components comprises a milling head 9 provided with including a support beam 8, a pivot body 14 which is pivotally supported and guided by the support beam 8 via a curved guide arrangement 36 so as to be pivotable about a first pivot axis B which extends normal to the longitudinal axis Z, and a motor milling spindle 11 supported on the pivot body 14 so as to be pivotable about a second pivot axis A which extends normal to the pivot axis B. The rotations of the pivot body 14 and of the milling spindle 11 are controlled by the drive arrangements 37, 50 assigned to the pivot axis A, B. The curved guide arrangement 36 includes guide carriages 34 mounted to the support beam 8 and a circular arc segment shaped guide track 32 which is attached to the pivot body 14 and which facilitates a pivot range about the first pivot axis B of at least 180°. A cavity 31 provided in the pivot body 14 for accommodating the milling spindle 11 facilitates of at least about 180° about the second axis A. The milling head 9 is of a compact light-weight design with a reduced interference contour which makes the manufacture of complex surface areas possible with high quality and within short machining times.

What is claimed is:

1. A tool head unit for the milling of a workpiece comprising:
   a support beam (8), which defines a longitudinal axis (Z), a pivot body (14) which is supported by the support beam (8) and which is pivotable about a first pivot axis (B) with respect to the support beam (8) by means of a first drive arrangement (37);
   a machine-tool spindle (11) which is supported on the pivot body (14) and which is pivotable about a second pivot axis (A) with respect to the pivot body (14) by means of a second drive arrangement (50);
   at least one of the pivot body (14) with respect to the support beam (8) and the machine tool spindle (11) with respect to the pivot body (14) has two curved guide arrangements (36, 36') effectively arranged therebetween, for pivotable support and guidance of the pivot body, or the machine tool spindle, respectively;
   wherein each of the two curved guide arrangements (36, 36; 36', 36') includes a pivotally mounted circular arc segment guide track (32, 32; 32', 32'), and wherein said two circular arc segment guide tracks extend co-axially around the respective pivot axis (B, A) and parallel to each other in axially spaced relationship with respect to the respective pivot axis (B, A); and
   wherein each curved guide arrangement (36, 36') includes at least two guide carriages (34, 34; 34', 34') in which the respective circular arc segment guide track is movably guided.

2. A tool head unit according to claim 1, wherein the machine tool spindle (11) is a motor milling spindle.

3. A tool head unit according to claim 1, wherein the first pivot axis (B) is oriented normal to the longitudinal axis (Z), the second pivot axis (A) is oriented normal to the first pivot axis (B) and the longitudinal axis (Z), the first pivot axis (B) and the second pivot axis (A) intersect one another about in the center of the machine tool spindle (11).

4. A tool head unit according to claim 1, wherein the two circular arc segment guide tracks (32, 32; 32', 32') are mounted at least to one of the pivot body (14) and the machine tool spindle (11) and the respective guide carriages (34, 34') are connected to at least one of the support beam (8) and the pivot body (14), respectively.

5. A tool head unit according to claim 1, wherein the curved guide arrangements (36) are disposed effectively between the pivot body (14) and the support beam (8).

6. A tool head unit according to claim 5, wherein the support beam (8) further includes at its end adjacent the pivot body (14) two beam extensions (19a, 19b) which extend slightly around the pivot element (14) and support the guide carriages (34) of the curved guide arrangements (36).

7. A tool head unit according to claim 6, wherein the beam extensions (19a, 19b) extend in the longitudinal direction (Z) for a fraction of the length in the longitudinal direction (Z) of the pivot element (14).

8. A tool head unit according to claim 5, wherein the pivot body (14) has an essentially cylindrical base body having two axial front end faces (26) at which the curved guide arrangements (36) are disposed, the base body having a circumferential surface area (23) having an opening so arranged that the tool spindle (11) can be accommodated therein and, upon pivoting about the second pivot axis (A), the tool spindle can project beyond the axial front end faces (26) of the pivot body (14).

9. A tool head unit according to claim 8, wherein the pivot body (14) includes two C-shaped disc elements (21a, 21b) which are arranged parallel and spaced from each other in the direction of the first pivot axis (B) and are interconnected by two connecting webs (22a, 22b), which extend parallel to each other and spaced from each other in the direction of the second pivot axis (A).

10. A tool head unit according to claim 9, wherein the disc elements (21a, 21b) each carry at a respective one of the front end faces (26) a respective one of the guide tracks (32) of the respective curved guide arrangement (36), which guide tracks have essentially the same outer diameter as the disc elements (21a, 21b) and which are supported by the guide carriages (34) of the curved guide arrangements (36), which are mounted on the support beam (8).

11. A tool head unit according to claim 1, wherein the curved guide arrangements are disposed effectively between the machine tool spindle (11) and the pivot body (14).

12. A tool head unit according to claim 11, wherein the curved guide arrangements (36; 36') are also disposed effectively between the support beam (8) and the pivot body (14).

13. A tool head unit according to claim 1, wherein the guide tracks (32, 32') each have the form of a circular arc segment which extends over an arc segment angle.

14. A tool head unit according to claim 13, wherein the arc segment angle is at least 200°.

15. A tool head unit according to claim 13, wherein the normal distance between free ends (32a, 32b) of each of the circular arc segment-like guide tracks (32, 32; 32', 32') is greater than the dimension of the machine tool spindle (11) as measured in the direction of the normal distance.

16. A tool head unit according to claim 1, wherein the curved guide arrangements (36, 36') provide for a pivot movement of the pivot body (14) or, respectively the machine tool spindle (11) over at least about 180°.

17. A tool head unit according to claim 1, wherein each of the guide tracks (32, 32') is a single piece component.

18. A tool head unit according to claim 1, wherein the first drive arrangement (37) includes a motor (38) attached to the support beam (8), and a step-down transmission arrangement (39) disposed between the support beam (8) and pivot body (14).

19. A tool head unit according to claim 18, wherein the transmission arrangement (39) further includes a spur gear structure arranged at the circumferential surface (23) of the pivot body (14).

20. A tool head unit according to claim 18, wherein the first drive arrangement (37) forms a pre-tensioned drive.

21. A tool head unit according to claim 1, further including a measurement arrangement (43) for determining the relative pivot angle between the support beam (8) and the pivot body (14).

22. A tool head unit according to claim 1, further including a shaft (47) defining the second pivot axis (A) and rotatably supported in the pivot body (14), and the machine tool spindle (11) connected to the shaft (47).

23. A tool head unit according to claim 1, wherein the second drive arrangement (50) includes a torque motor (49) for directly driving and controlling the rotation of the machine tool spindle (11).

24. A tool head unit according to claim 1, further including a measurement arrangement (51) for determining the relative pivot angle between the machine tool spindle (11) and the pivot body (14).

25. A tool head unit according to claim 1, wherein the machine tool spindle (11) is removably supported in a spindle receiver (16).

* * * * *